US008370896B2

(12) United States Patent
Brown et al.

(10) Patent No.: US 8,370,896 B2
(45) Date of Patent: *Feb. 5, 2013

(54) SYSTEM AND METHOD FOR DETERMINING A SECURITY ENCODING TO BE APPLIED TO OUTGOING MESSAGES

(75) Inventors: Michael Kenneth Brown, Fergus (CA); Michael Grant Kirkup, Waterloo (CA); Michael Stephen Brown, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/324,180

(22) Filed: Dec. 13, 2011

(65) Prior Publication Data

US 2012/0137341 A1 May 31, 2012

Related U.S. Application Data

(63) Continuation of application No. 12/644,889, filed on Dec. 22, 2009, now Pat. No. 8,099,759, which is a continuation of application No. 11/261,701, filed on Oct. 31, 2005, now Pat. No. 7,640,575.

(60) Provisional application No. 60/686,050, filed on Jun. 1, 2005.

(51) Int. Cl.
*H04L 9/00* (2006.01)
*H04L 9/32* (2006.01)
(52) U.S. Cl. ..................... 726/1; 726/2; 726/3
(58) Field of Classification Search .............. 726/1–3, 726/26–27; 713/160–162, 165–168, 170, 713/189; 380/255, 270
See application file for complete search history.

(56) References Cited

U.S. PATENT DOCUMENTS

| 5,377,354 A | 12/1994 | Scannell et al. |
| 5,659,616 A | 8/1997 | Sudia |
| 5,948,103 A | 9/1999 | Fukuzaki |
| 5,983,350 A | 11/1999 | Minear et al. |
| 5,999,932 A | 12/1999 | Paul |
| 6,072,942 A | 6/2000 | Stockwell et al. |
| 6,732,273 B1 | 5/2004 | Byers |
| 7,069,580 B1 | 6/2006 | Deitz et al. |
| 7,254,712 B2 * | 8/2007 | Godfrey et al. ............ 713/176 |

(Continued)

FOREIGN PATENT DOCUMENTS

| CA | 2579909 | 10/2011 |
| CN | 101027869 A | 8/2007 |

(Continued)

OTHER PUBLICATIONS

European Examination Report, European Patent Application No. 05850121.4 dated Nov. 27, 2008.

(Continued)

*Primary Examiner* — Hosuk Song
(74) *Attorney, Agent, or Firm* — Bereskin and Parr LLP/ S.E.N.C.R.L., s.r.l.

(57) ABSTRACT

A system and method for determining a security encoding to be applied to a message being sent by a user of a computing device. In one broad aspect, the device comprises a processor configured to: determine whether a general message encoding configuration setting indicates that when a security encoding is to be applied to a message then the security encoding is to be established by a policy engine; if the general message encoding configuration setting so indicates, query the policy engine for the security encoding to be applied to the message; otherwise, determine the security encoding to be applied to the message in accordance with a user-selected security encoding; and apply the determined security encoding to the message prior to transmission of the message to at least one recipient.

22 Claims, 5 Drawing Sheets

U.S. PATENT DOCUMENTS

| | | | |
|---|---|---|---|
| 7,266,847 B2 * | 9/2007 | Pauker et al. | 726/27 |
| 7,640,575 B2 | 12/2009 | Brown et al. | |
| 8,099,759 B2 | 1/2012 | Brown et al. | |
| 2005/0039004 A1 | 2/2005 | Adams et al. | |

FOREIGN PATENT DOCUMENTS

| | | |
|---|---|---|
| EP | 1790113 | 10/2009 |
| SG | 131183 | 6/2010 |
| WO | 99/05814 | 2/1999 |

OTHER PUBLICATIONS

Chinese First Office Action (English translation), Chinese Patent Application No. 200580032700.8 dated May 22, 2009.

European Supplementary Search Report and Examination Opinion, European Patent Application No. 05850121.4 dated Sep. 14, 2007.

PCT International Search Report and Written Opinion of the International Searching Authority, PCT Application No. PCT/CA2005/001664 dated Mar. 6, 2006.

First Indian Examination Report for Indian Patent Application No. 2136/DELNP/2007 dated Jun. 23, 2011.

European Communication under Rule 71(3) EPC, European Patent Application No. 05850121.4 dated May 8, 2009.

European Amendment or Correction of the text intended for Grant , European Patent Application No. 05850121.4 dated Sep. 15, 2009.

European Decision to grant a European patent Application pursuant to Article 97(1) EPC, European Patent Application No. 05850121.4 dated Sep. 24, 2009.

Canadian Office Action, Canadian Patent Application No. 2,579,909 dated May 3, 2010.

Chinese Second Office Action, Chinese Patent Application No. 200580032700.8 dated Jul. 30, 2010.

United States Notice of Allowance, U.S. Appl. No. 12/644,889 dated Sep. 15, 2011.

United States Response, U.S. Appl. No. 12/644,889 dated Aug. 3, 2011.

United States Office Action, U.S. Appl. No. 12/644,889 dated May 5, 2011.

United States Certificate of Correction—Post Issue Communication, U.S. Appl. No. 11/261,701 dated Sep. 21, 2010.

United States Certificate of Correction—Post Issue Communication, U.S. Appl. No. 11/261,701 dated Nov. 16, 2010.

United States Request for Certificate of Correction, U.S. Appl. No. 11/261,701 dated Aug. 19, 2010.

United States Petition Decision, U.S. Appl. No. 11/261,701 dated May 12, 2010.

United States Request for Recalculation, U.S. Appl. No. 11/261,701 dated May 6, 2010.

United Slates Notice of Allowance, U.S. Appl. No. 11/261,701 dated Aug. 19, 2009.

United States Response, U.S. Appl. No. 11/261,701 dated Jun. 5, 2009.

United States Non-Final Office Action, U.S. Appl. No. 11/261,701 dated Mar. 5, 2009.

United States Terminal Discialmer Review Decision, U.S. Appl. No. 12/644,889 dated Aug. 27, 2011.

United States Terminal Disclaimer, U.S. Appl. No. 12/644,889 dated Aug. 3, 2011.

PCT International Preliminary Report on Patentability, PCT Application No. PCT/CA2005/001664 dated Dec. 21, 2007.

Chinese Notification of Completion of Grant Formalities for Registration, Chinese Patent Application No. 200580032700.8 dated Aug. 26, 2011.

Chinese Notice of Publication and Entry into Substantive Examination, Chinese Patent Application No. 200580032700.8 dated Sep. 14, 2007.

Singapore Certificate of Grant of Patent, Singapore Patent Application No. 200702009-2, dated Jun. 30, 2010.

European Certificate of Grant, European Patent Application No. 05850121.4 dated Oct. 21, 2009.

Canadian Notice of Allowance, Canadian Patent Application No. 2,579,909 dated Apr. 1, 2011.

Response. European Application No. 05850121.4. Dated: Jul. 28, 2008.

Response. European Application No. 05850121.4. Dated: Mar. 23, 2009.

\* cited by examiner

SYSTEM AND METHOD FOR DETERMINING A SECURITY ENCODING TO BE APPLIED TO OUTGOING MESSAGES

CROSS-REFERENCE TO RELATED APPLICATIONS

This application is a continuation of U.S. patent application Ser. No. 12/644,889, filed on Dec. 22, 2009 and issued to patent as U.S. Pat. No. 8,099,759, which is a continuation of U.S. patent application Ser. No. 11/261,701, filed on Oct. 31, 2005 and issued to patent as U.S. Pat. No. 7,640,575, which claims the benefit of U.S. Provisional Application No. 60/686,050, filed on Jun. 1, 2005. The entire contents of U.S. Patent Application No. 12/644,889, U.S. patent application Ser. No. 11/261,701 and U.S. patent application Ser. No. 60/686,050 are hereby incorporated by reference.

FIELD OF THE INVENTION

Embodiments of the invention relate generally to the processing of messages, such as e-mail messages, and more specifically to systems and methods for controlling the application of security encoding techniques (e.g. encryption, signing) to messages being sent by users of computing devices (including, for example, mobile devices).

BACKGROUND OF THE INVENTION

Electronic mail ("e-mail") messages may be generally encoded using one of a number of known protocols to facilitate secure message communication. The Secure Multiple Internet Mail Extensions ("S/MIME") protocol, for example, relies on public and private encryption keys to provide confidentiality and integrity, and on a Public Key Infrastructure (PKI) to communicate information that provides authentication and authorization. Data encoded using a private key of a private key/public key pair, can only be decoded using the corresponding public key of the pair, and vice-versa. In S/MIME, the authenticity of public keys used in the encoding of messages may be validated using certificates. Other known standards and protocols may be employed to facilitate secure message communication, such as Pretty Good Privacy™ (PGP) and variants of PGP such as OpenPGP, for example. It is understood that as compared to S/MIME-based systems, PGP-based systems also utilize public and private encryption keys to provide confidentiality and integrity, although the authenticity of public keys used in the encoding of PGP messages are validated in a different manner.

When a user wishes to send a message to be encrypted (e.g. using S/MIME or PGP), message data will be encrypted using the public key of a private key/public key pair associated with the intended recipient of the message, such that the encrypted message data can only be subsequently decrypted by the corresponding private key of the same pair supposedly possessed only by the recipient. In some implementations, a session key is encrypted/decrypted, rather than the message itself. When a user wishes to send a message that is to be digitally signed (e.g. using S/MIME or PGP), a digest generated from the message will be encoded using the private key of a private key/public key pair associated with the user (i.e. the sender of the message in this example) to produce a digital signature, such that the signature can only be successfully verified using the corresponding public key of the same pair.

After a user composes a message and before it is sent, the user can typically decide what encoding, if any, is to be applied to the message. For example, the user may choose to encrypt the message without signing, to sign the message without encrypting, to both encrypt and sign the message, or to send the message unencrypted and unsigned. Some known messaging applications may be adapted to analyze certain data and suggest a security encoding for messages to the user. For example, the messaging application may determine that the composed message is a reply to a received message that has been encoded in a certain way, and suggest to the user that the same security encoding be applied to the composed message. As a further example, the messaging application may be configured to track the security encoding applied to previous messages sent by the user to particular recipients, and suggest to the user that the same security encoding should be applied to the composed message if the message is intended to be sent to one or more of those recipients. In any event, the user is free to select the desired security encoding for any given message that he or she composes.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

DETAILED DESCRIPTION

Figure 1:
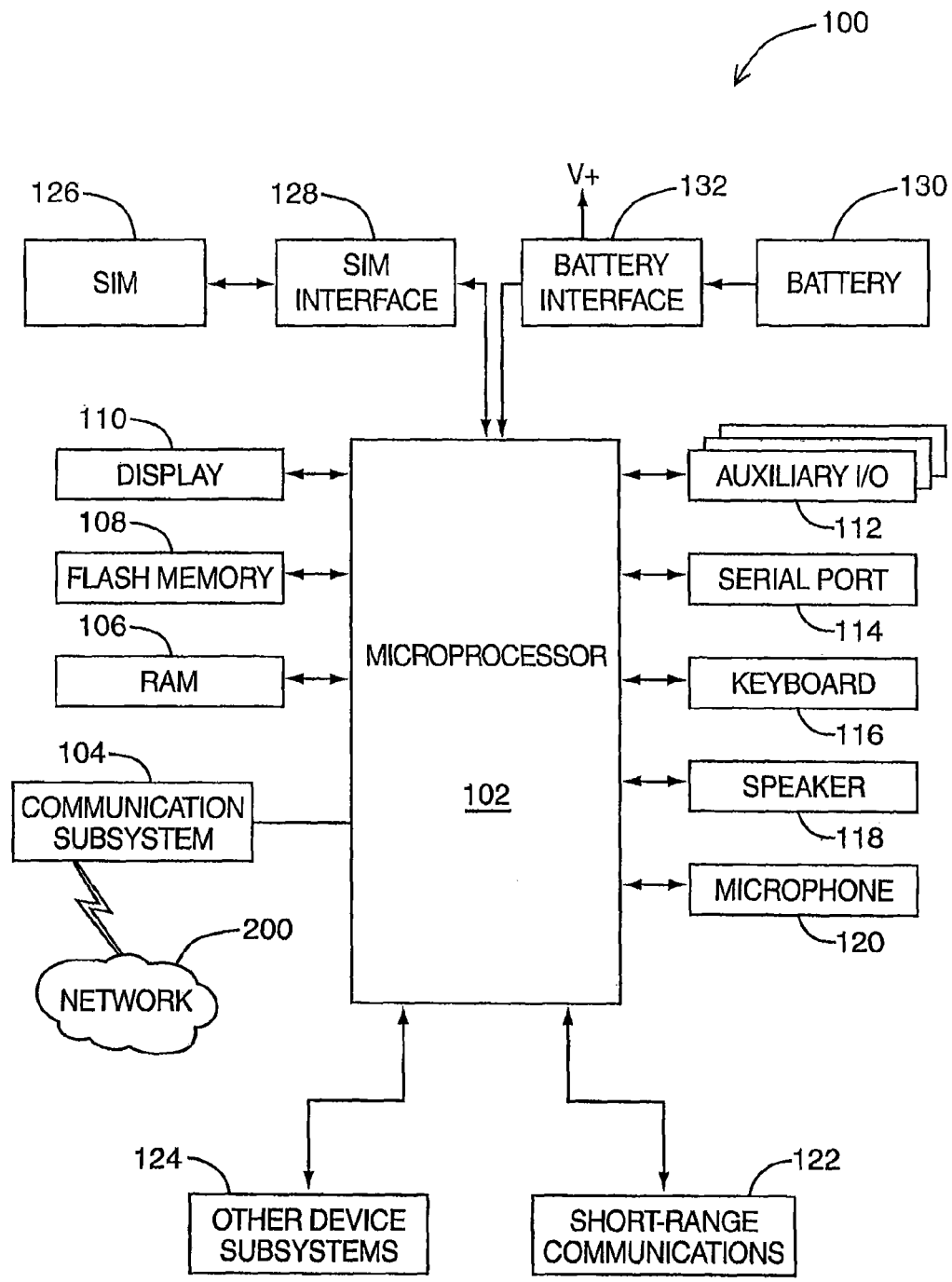
FIG. 1 is a block diagram of a mobile device in one example implementation.

Embodiments described herein relate generally to systems and methods in which a security encoding to be applied to messages can be determined with minimal user intervention. In at least one embodiment, a policy engine to which the user's computing device is coupled dictates the security encoding to be applied to messages being sent, and determinations of which security encoding is to be applied to any given message are deferred to this policy engine. This may minimize or even eliminate the need for a user to make security-related decisions when composing and sending messages. This can enhance usability of the computing device by making the process of sending messages more efficient, which can be particularly advantageous when the computing device is a mobile device.

In one broad aspect, there is provided a method of determining a security encoding to be applied to a message being sent by a user of a computing device, the method comprising the steps of: identifying a message to be sent to at least one recipient; determining, at the computing device, whether a general message encoding configuration setting thereon is set to a value that indicates that the security encoding to be applied to the identified message is to be established by a policy engine; where the general message encoding configuration setting on the computing device is set to a value that indicates that the security encoding to be applied to the identified message is to be established by the policy engine, determining the security encoding to be applied to the identified message by querying the policy engine for the security encoding to be applied to the identified message; applying the determined security encoding to the identified message; and transmitting the identified message to which the security encoding has been applied to the at least one recipient.

In another broad aspect, there is provided a system for determining a security encoding to be applied to a message being sent by a user of a computing device, wherein the system comprises a policy engine connected to the computing device, and wherein the steps of an embodiment of a method as described herein are performed by the system.

In one embodiment, the policy engine is implemented in a device remote from the computing device. The computing device may be a mobile device, for example. The policy engine may be implemented in a PGP Universal Server in PGP-based applications, for example.

These and other features of various embodiments will be described in greater detail below.

Some embodiments of the systems and methods described herein make reference to a mobile device. A mobile device is a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 2:
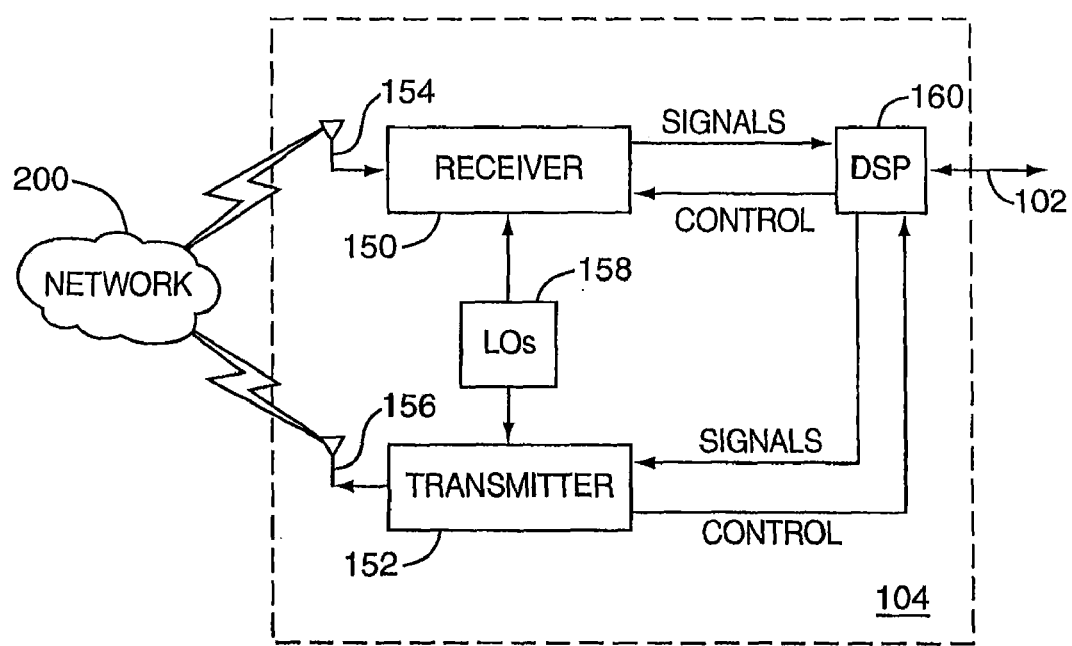
FIG. 2 is a block diagram of a communication subsystem component of the mobile device of FIG. 1.
Figure 3:
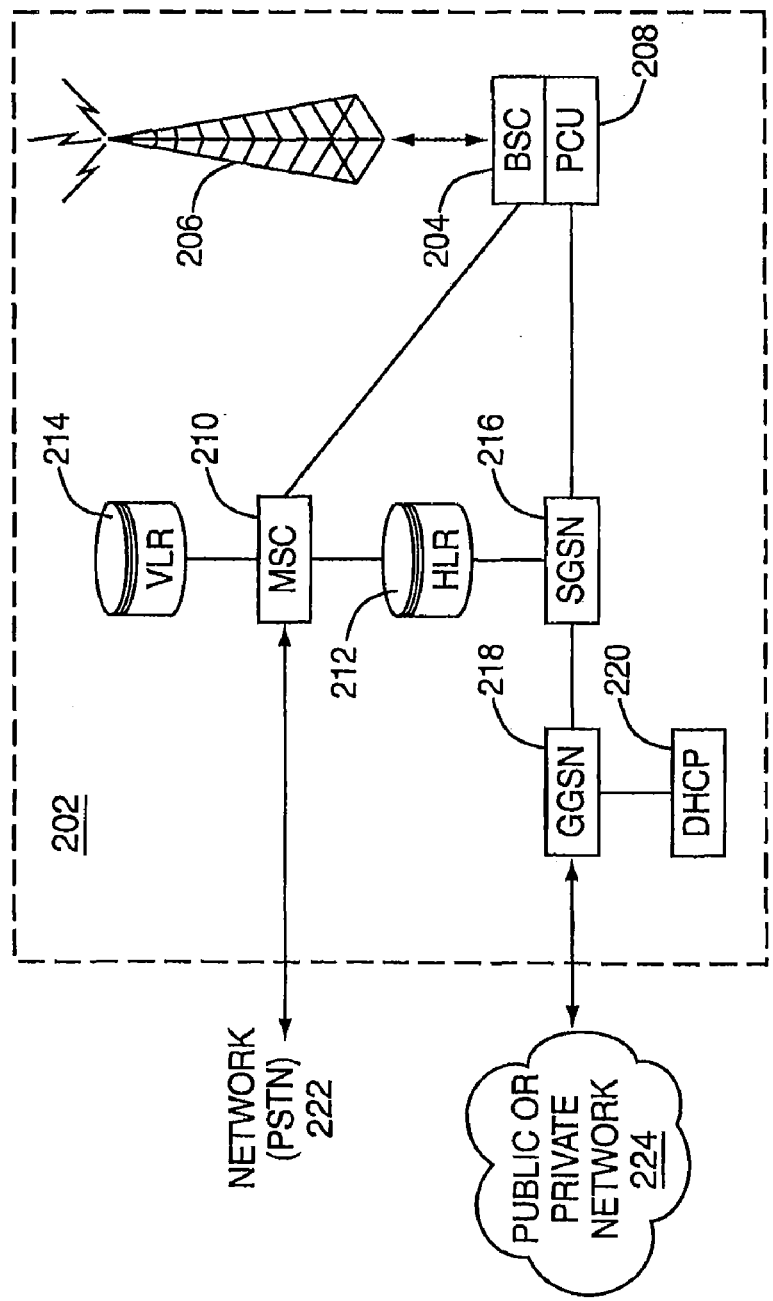
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
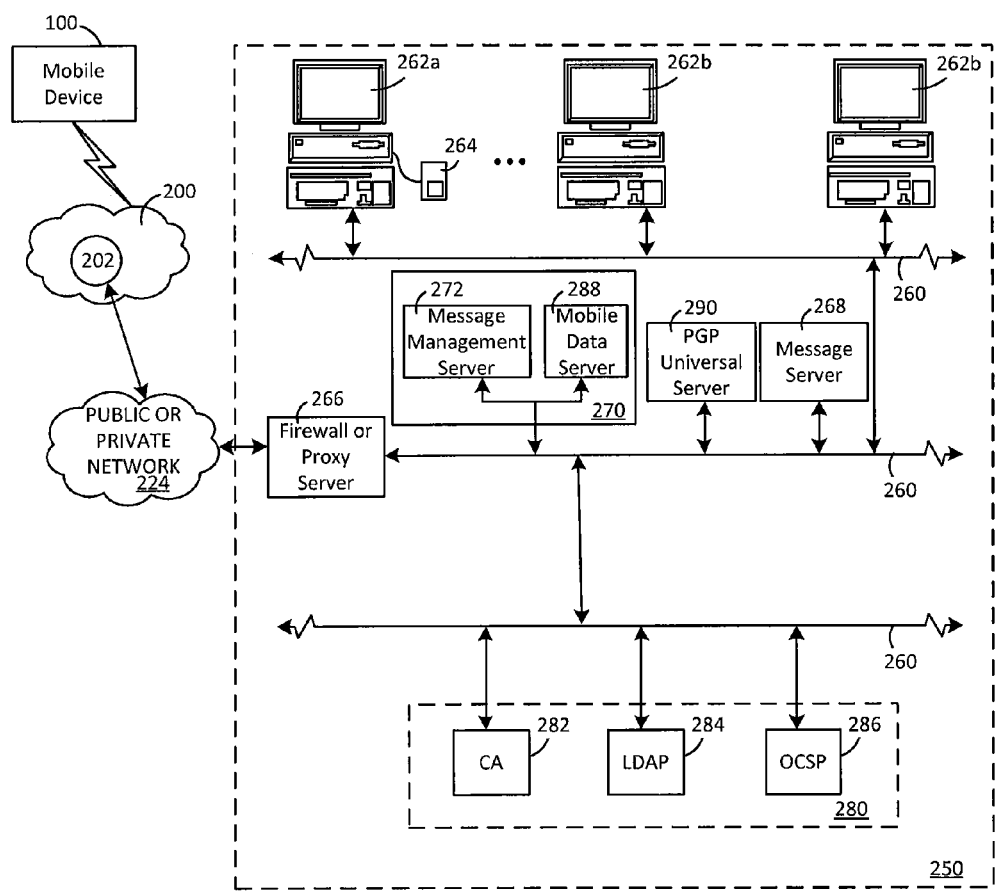
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computing device ("desktop computer") 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include S/MIME certificates or PGP keys used in the exchange of messages. The process of downloading information from a user's desktop computer 262a to the user's mobile device 100 may also be referred to as synchronization.

It will be understood by persons skilled in the art that user computers 262a, 262b will typically be also connected to other peripheral devices not explicitly shown in FIG. 4. Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages would then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices need to be supported.

In some embodiments described herein, certificates are used in the processing of encoded messages, such as e-mail messages, that are encrypted and/or signed. While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and provides data integrity and privacy from the time an originator of a message sends a message until it is decoded and read by the message recipient. In other embodiments of described herein, other standards and protocols may be employed to facilitate secure message communication, such as Pretty Good Privacy™ (PGP) and variants of PGP such as OpenPGP, for example. It will be understood that where reference is generally made to "PGP" herein, the term is intended to encompass any of a number of variant implementations based on the more general PGP scheme.

Secure messaging protocols such as S/MIME and PGP-based protocols rely on public and private encryption keys to provide confidentiality and integrity. Data encoded using a private key of a private key/public key pair can only be decoded using the corresponding public key of the pair, and vice-versa. It is intended that private key information never be made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate successful decryption of the message, and in this way, the confidentiality of messages can be maintained.

As a further example, a sender may sign a message using a digital signature. A digital signature is a digest of the message (e.g. a hash of the message) encoded using the sender's private key, which can then be appended to the outgoing message. To verify the digital signature of the message when received, the recipient uses the same technique as the sender (e.g. using the same standard hash algorithm) to obtain a digest of the received message. The recipient also uses the sender's public key to decode the digital signature, in order to obtain what should be a matching digest for the received message. If the digests of the received message do not match, this suggests that either the message content was changed during transport and/or the message did not originate from the sender whose public key was used for verification. Digital signature algorithms are designed in such a way that only someone with knowledge of the sender's private key should be able to encode a signature that the recipient will decode correctly using the sender's public key. Therefore, by verifying a digital signature in this way, authentication of the sender and message integrity can be maintained.

An encoded message may be encrypted, signed, or both encrypted and signed. In S/MIME, the authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509). The certificates are typically digitally signed by the certificate authority.

In PGP-based systems, a PGP key is used, which is like a certificate in that it contains public information including a public key and information on the key holder or owner. Unlike S/MIME certificates, however, PGP keys are not generally issued by a certificate authority, and the level of trust in the authenticity of a PGP key typically requires verifying that a trusted individual has vouched for the authenticity of a given PGP key.

Standard e-mail security protocols typically facilitate secure message transmission between non-mobile computing devices (e.g. computers 262a, 262b of FIG. 4; remote desktop devices). In order that signed messages received from senders may be read from mobile device 100 and that encrypted messages be sent from mobile device 100, mobile device 100 is adapted to store public keys (e.g. in S/MIME certificates, PGP keys) of other individuals. Keys stored on a user's computer 262a will typically be downloaded from computer 262a to mobile device 100 through cradle 264, for example.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key is preferably exchanged between the computer 262a and mobile device 100 so that the user may share one identity and one method for accessing messages.

User computers 262a, 262b can obtain S/MIME certificates and PGP keys from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple PKI servers 280 associated with the organization reside on LAN 250. PKI servers 280 include a CA server 282 for issuing S/MIME certificates, an LDAP server 284 used to search for and download S/MIME certificates and/or PGP keys (e.g. for individuals within the organization), and an OCSP server 286 used to verify the revocation status of S/MIME certificates.

Certificates and/or PGP keys may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates and PGP keys through a mobile data server 288. Similarly, mobile data server 288 may be adapted to allow mobile device 100 to directly query OCSP server 286 to verify the revocation status of S/MIME certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of certificates and PGP keys [not shown] may include a Windows certificate or key store, another secure certificate or key store on or outside LAN 250, and smart cards, for example.

In at least one embodiment, a policy engine 290 resides in LAN 250. In some embodiments of the systems and methods described herein, the policy engine 290 is provided by way of a PGP Universal Server developed by PGP Corporation. This is only one example. In variant embodiments, the policy engine may be implemented in some other device or construct other than a PGP Universal Server, and may be applied in the context of protocols other than PGP (e.g. in an S/MIME policy engine).

A PGP Universal Server 290 is adapted to communicate with a user's desktop computer (e.g. 262a) and the user's mobile device (e.g. 100 via message management server 272), and may be further adapted to encrypt messages and enforce compliance of security requirements with respect to messages being sent by the user, based on policies established by an administrator, for example. The placement of PGP Universal Server 290 in LAN 250 as shown in FIG. 4 is provided by way of example only, and other placements and configurations are possible. Depending on the placement of the PGP Universal Server 290 and the particular configuration of LAN 250 in which PGP Universal Server 290 may be employed, the level of control over processed messages that are subject to security encoding, and in particular, over messages being sent by a user, may vary.

For example, PGP Universal Server 290 may be adapted to directly process all outgoing messages (i.e. messages being sent by the user from the user's desktop computer, mobile device, or other computing device to one or more intended recipients), where it will make decisions on which messages to encrypt and/or sign, if at all, in accordance with policies defined on the PGP Universal Server 290 as configured by the administrator. If a policy dictates that a message about to be sent by the user to a particular domain or pertaining to a particular subject is to be encrypted and signed using PGP for example, the PGP Universal Server 290 may itself encrypt and sign the message before transmission. Alternatively, the user (e.g. through a PGP-enabled client application on the user's computing device that communicates with PGP Universal Server 290) may download policy data from the PGP Universal Server 290 to the user's computing device, and be directed to encrypt and sign the message before transmission, based on the policy data obtained.

Accordingly, PGP Universal Server 290 provides the ability to enforce centralized policy based on domains and other mechanisms.

The PGP Universal Server 290 may also be adapted to store, validate, and otherwise manage PGP keys, and to retrieve PGP keys from remote key stores when the keys are required to encode (e.g. encrypt and/or sign) messages. Where requested by a user (e.g. through a PGP client application), PGP Universal Server 290 may also provide stored or retrieved PGP keys to the user as needed.

By adopting the use of a policy engine such as that implemented by a PGP Universal Server 290 as described herein by way of example, much of the burden associated with processing secure messages (e.g. e-mail), and in particular, with deciding what messages are to be sent securely and what security encoding should apply on a case-by-case basis, can be transferred to the policy engine.

In a typical known system, when a user sends a message from a computing device such as a desktop computer or mobile device, for example, the message may be signed and/or encrypted at the user's option. Some users will prefer to select a specific security encoding for messages that they compose (e.g. they will want to decide whether to send the message as plain text, sign the message, encrypt the message, or both sign and encrypt the message) on a message-by-message basis.

Furthermore, an application (e.g. an e-mail client or other messaging application) residing and executing on the computing device may be configured to suggest a security encoding for outgoing messages based on one or more security encoding selection algorithms. For example, if the application determines that a message to be sent is a "reply" message or a "forward" message derived from a message previously received by the user, the application may suggest to the user that the security encoding used in the original message should also be applied to the message to be sent. As a further example, if the messaging application manages a recipient cache, which stores data that tracks particular security encodings that have been associated with specific recipients (e.g. it can track which security encoding was used when the user last sent a message to a particular recipient), the application may suggest to the user that the same security encoding be used when a subsequent message is sent to the same recipient, as identified from data is stored in the recipient cache. The application may also be configured to apply some default security encoding (e.g. PGP-[Encrypt Only]) whenever a security encoding cannot be determined based on these or other selection algorithms that may be applied.

In contrast to known systems, in systems that provide for a policy engine such as a PGP Universal Server 290, the need for users to manually decide what security encoding should be applied to a given message may be eliminated.

Embodiments of systems and methods described herein permit users to defer to the encoding policies as defined at a policy engine, such as the PGP Universal Server in one example, in the making of encoding-related decisions.

A general message encoding configuration setting, which may also be referred to as a "Global Default" setting, is configurable through an application on the computing device. This setting can be set to a value that indicates that the security encoding to be applied to a message sent from the computing device is to be established by the policy engine. Where the general message encoding configuration setting is set to this value, the application will rely on the policy engine to dictate the security encoding requirements for any message sent from the computing device.

In one embodiment, where the general message encoding configuration setting is set to a value that indicates that the security encoding to be applied to a message sent from the computing device is to be established by the policy engine, the security encoding would no longer be determined in accordance with a security encoding selection algorithm (e.g. encodings based on a previously received message or on data in a recipient cache) as the security encodings defined by the policy engine will take precedence.

In another embodiment, where the general message encoding configuration setting is set to a value that indicates that the security encoding to be applied to a message sent from the computing device is to be established by the policy engine, a user is not permitted to override the security encoding that is to be applied to a message with some other user-selected security encoding, as the security encodings defined by the policy engine will take precedence. Furthermore, where the general message encoding configuration setting is set to a value that indicates that the security encoding to be applied to a message sent from the computing device is to be established by the policy engine, the user may not be prompted about any difficulties in processing the message (e.g. when encryption keys cannot be found for a recipient), as resolution of these problems would also be deferred to the policy engine.

Conceptually, at least some of the features of these embodiments allow a "Novice User" security mode to be provided, where the user can choose to simply accept the security encoding policies as dictated by the policy engine (e.g. the PGP Universal Server), and need not be prompted to confirm security encodings that are to be used when sending messages. This may make the process of sending encoded messages simpler from the user's perspective and more efficient.

If the user wishes to retain manual control over which security encodings are to be applied to messages that he or she sends, and/or to re-activate the application of one or more security encoding selection algorithms, the user may change the value of the general message encoding configuration setting to one that does not indicate that the security encoding to be applied to the identified message is to be established by the policy engine. In one embodiment, the value of the general message encoding configuration setting may instead be set to define some specific default security encoding (e.g. PGP [Encrypt only]), for example. The value of the general message encoding configuration setting may also be set through IT Policy in a variant embodiment.

Figure 5:
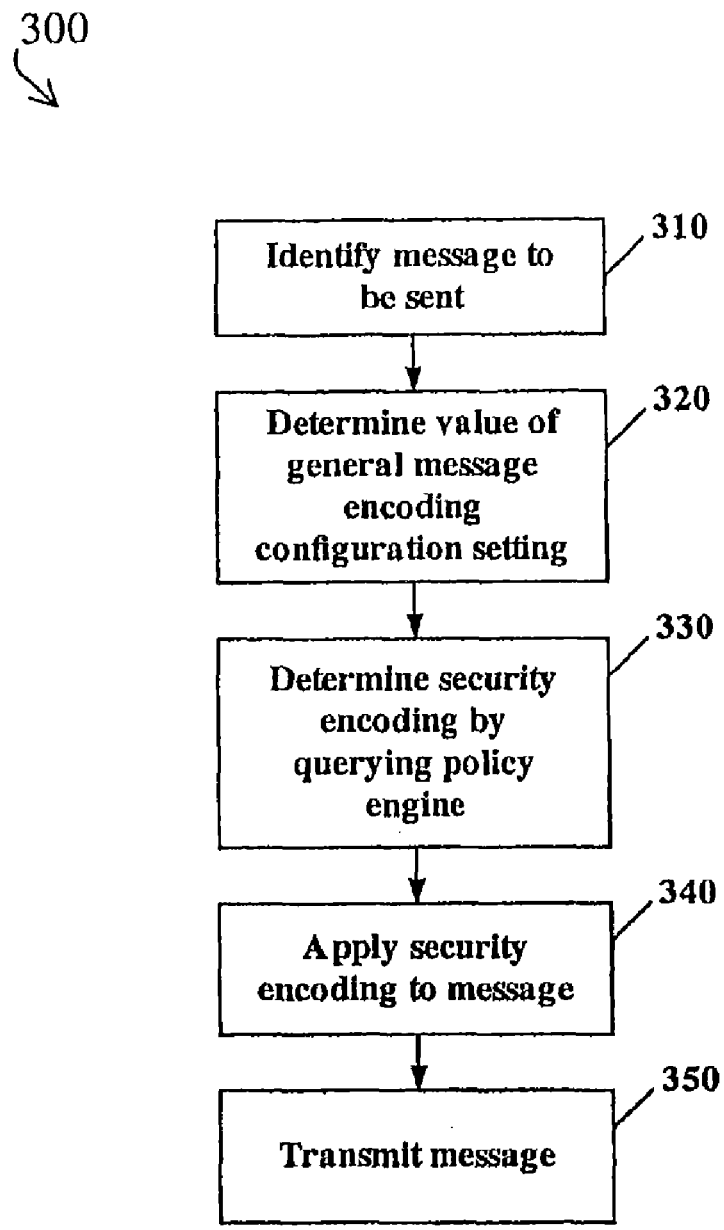
FIG. 5 is a flowchart illustrating steps in a method of determining a security encoding to be applied to outgoing messages in one embodiment.

Referring to FIG. 5, a flowchart illustrating steps in a method of determining a security encoding to be applied to outgoing messages in one embodiment is shown generally as 300. Further details with respect to various steps of method 300 and with respect to features that may be employed in variant embodiments have been discussed earlier in this specification.

Reference is made in method 300 to outgoing messages, which are in general, messages composed by a user that are in the process of being sent from a computing device to one or more recipients. The computing device may be a desktop computer (which may, for instance, include a laptop computer or some other computing device that a mobile device may synchronize with), a mobile device, or some other device that can communicate with a policy engine (e.g. PGP Universal Server 290 of FIG. 4). The policy engine will typically be implemented in a device remotely located from the computing device (i.e. not directly implemented on the computing device itself), but may nevertheless reside in the same network (e.g. LAN 250).

At least some of the steps of method 300 are performed by an application executing and residing on the computing device. The application may be an e-mail or other messaging application, another application coupled to or otherwise integrated with the e-mail or other messaging application (e.g. an add-on component providing the requisite functionality), or some other application programmed to perform such steps. Depending on the configuration of the particular system embodiment, some steps of method 300 may be performed by the policy engine coupled to the computing device.

At step 310, a message to be sent to at least one recipient is identified at the computing device.

At step 320, it is determined whether a general message encoding configuration setting at the computing device is set to a value that indicates that the security encoding to be applied to the identified message is to be established by a policy engine.

In one embodiment, the general message encoding configuration setting is identified as a "Global Default" setting on the computing device, which can be configured by a user, or possibly through an IT Policy. For example, in a list of configuration settings, the user may set the "Global Default" setting associated with the encoding of outgoing messages as follows:

Global Default: [PGP Universal Default] (Novice Mode)

In this particular implementation, by setting "Global Default" to "[PGP Universal Default] (Novice Mode)", this indicates that the application must defer to the security encoding policies of the policy engine (e.g. the PGP Universal Server) to determine the appropriate encoding for an outgoing message. In one embodiment, when the "Global Default" is set in this way, security encoding selection algorithms that would normally be relied upon to suggest a security encoding would not be applied, and the user would not be prompted or permitted to manually select a security encoding. On the other hand, if the "Global Default" has been set to some other value that does not specifically indicate that the security encoding is to be established by the policy engine, such as:

e.g. Global Default: [PGP-Encrypt] or
      Global Default: [PGP-Sign and Encrypt] or
      Global Default: [PGP-Encrypt Only] or
      Global Default: [plain text], the security encoding selection algorithms may be relied upon to suggest a security encoding for a particular message (e.g. encodings based on a previously received message or on data in a recipient cache), and the current value of the "Global Default" setting may be used to suggest a default security encoding when one cannot be determined from these selection algorithms, in this embodiment. It will be understood that different selection algorithms other than those described herein may be employed in variant implementations.

In a variant embodiment, the general message encoding configuration setting may alternatively be provided as an "on/off" or other Boolean or multi-state flag, such that when the value of the setting is "on", this would indicate that the security encoding to be applied to the identified message is to be established by the policy engine. In one example, the value of a general message encoding configuration setting may be set as follows:

PGP Universal Server Encoding Override: [on]

Where the general message encoding configuration setting on the computing device is set to a value that indicates that the security encoding to be applied to the identified message is to be established by the policy engine, at step 330, the security encoding to be applied to the identified message is determined by querying the policy engine for that security encoding.

In one system embodiment, the encoding (e.g. encryption and/or signing) of messages, where required, is performed at the computing device. In this case, the application residing on the computing device may query the policy engine and download policy data from the policy engine to determine the appropriate security encoding for the identified message. For example, the downloaded policy data may indicate that messages to be sent to particular identified domains are to be encoded in a manner specific to those respective domains. Alternatively, the downloaded policy data may indicate that messages pertaining to particular identified subjects are to be encoded in a manner specific to those respective subjects. Other mechanisms to implement different security encoding policies may be employed.

In another system embodiment, messages are transmitted via the policy engine, which directly performs the necessary encoding (e.g. encryption and/or signing) of messages where required. In this case, policy data typically stored local to and accessible by the policy engine is queried to determine the appropriate security encoding for the identified message.

At step 340, the determined security encoding is applied to the message identified at step 310. This step may be performed at the computing device or by the policy engine, depending on the configuration of the particular system embodiment.

As noted in this specification, in exemplary embodiments, the step of applying a security encoding to a message entails one of the following: encrypting the message, signing the message, encrypting and signing the message, and neither encrypting nor signing the message.

At step 350, the message to which the security encoding is applied at step 340 is transmitted to the at least one recipient in known manner.

It will be understood that the features described herein may also be applied in systems facilitating secure message transmission employing different encoding techniques other than PGP, and/or where a policy engine or server other than a PGP Universal Server is employed, which dictates and/or enforces specific encodings (i.e. whether a message is to be encrypted and/or signed) for messages being sent by a user.

The steps of the methods described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A device comprising a processor, wherein the processor is configured to:
   determine whether a general message encoding configuration setting indicates that when a security encoding is to be applied to a message then the security encoding is to be established by a policy engine;
   if the general message encoding configuration setting indicates that when a security encoding is to be applied to the message then the security encoding is to be established by the policy engine, query the policy engine for the security encoding to be applied to the message;
   if the general message encoding configuration setting on the computing device does not indicate that when a security encoding is to be applied to the message then the security encoding is to be established by the policy engine, determine the security encoding to be applied to the message in accordance with a user-selected security encoding; and
   apply the determined security encoding to the message prior to transmission of the message to at least one recipient.

2. The device of claim 1, wherein the processor is further configured to transmit the message, with the determined security encoding applied to the message, to the at least one recipient.

3. The device of claim 1, wherein the policy engine is remote from the device.

4. The device of claim 1, wherein the policy engine is implemented in a PGP Universal Server.

5. The device of claim 1, wherein an application of the determined security encoding to the message comprises encrypting the message.

6. The device of claim 1, wherein an application of the determined security encoding to the message comprises signing the message.

7. The device of claim 1, wherein an application of the determined security encoding to the message comprises both encrypting and signing the message.

8. The device of claim 1, wherein the device comprises a mobile device.

9. The device of claim 1, wherein the device comprises a computing device.

10. The device of claim 1, wherein the general message encoding configuration setting is user-configured.

11. The device of claim 1, wherein the general message encoding configuration setting is configured through an IT Policy.

12. A device comprising a processor, wherein the processor is configured to:
   determine whether a general message encoding configuration setting indicates that when a security encoding is to be applied to a message then the security encoding is to be established by a policy engine;
   if the general message encoding configuration setting indicates that when a security encoding is to be applied to the message then the security encoding is to be established by the policy engine, query the policy engine for the security encoding to be applied to the message; and
   if the general message encoding configuration setting on the computing device does not indicate that when a security encoding is to be applied to the message then the security encoding is to be established by the policy engine, apply, prior to transmission of the message to at least one recipient, a same security encoding to the message as a security encoding applied to a second message previously received at the device wherein the message is derived from the second message.

13. The device of claim 12, wherein the processor is further configured to transmit the message to the at least one recipient.

14. The device of claim 12, wherein the policy engine is remote from the device.

15. The device of claim 12, wherein the policy engine is implemented in a PGP Universal Server.

16. The device of claim 12, wherein an application of the same security encoding to the message comprises encrypting the message.

17. The device of claim 12, wherein an application of the same security encoding to the message comprises signing the message.

18. The device of claim 12, wherein an application of the same security encoding to the message comprises both encrypting and signing the message.

19. The device of claim 12, wherein the device comprises a mobile device.

20. The device of claim 12, wherein the device comprises a computing device.

21. The device of claim 12, wherein the general message encoding configuration setting is user-configured.

22. The device of claim 12, wherein the general message encoding configuration setting is configured through an IT Policy.

* * * * *